Figure 9:
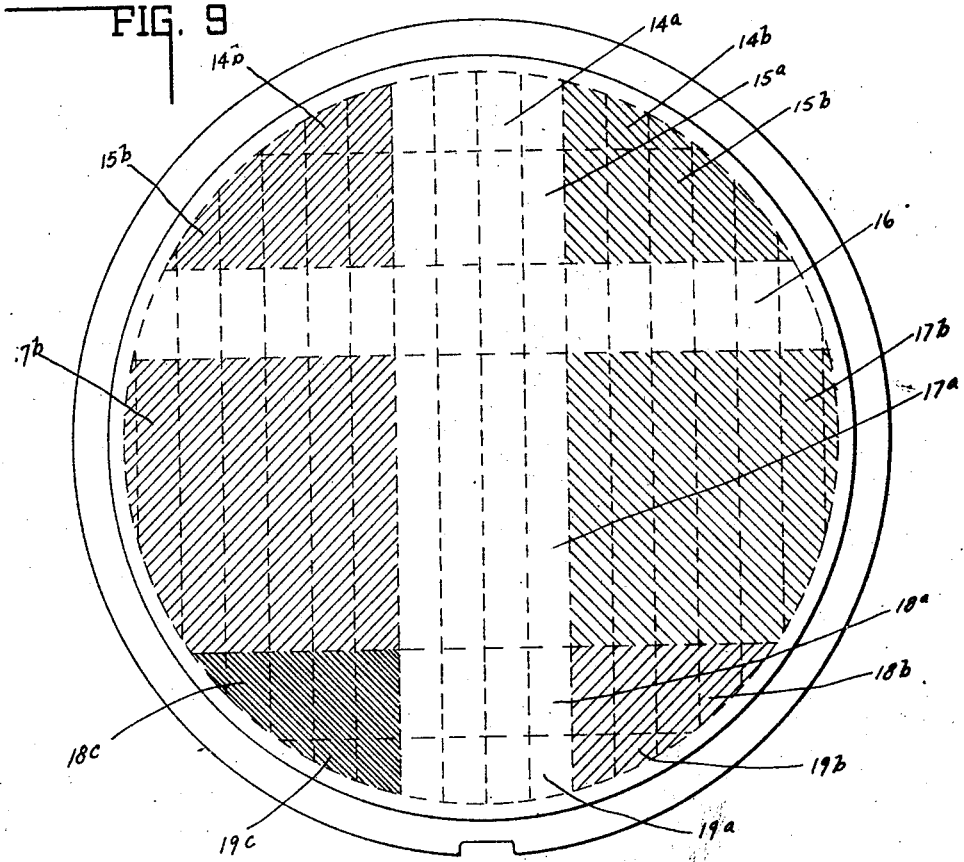

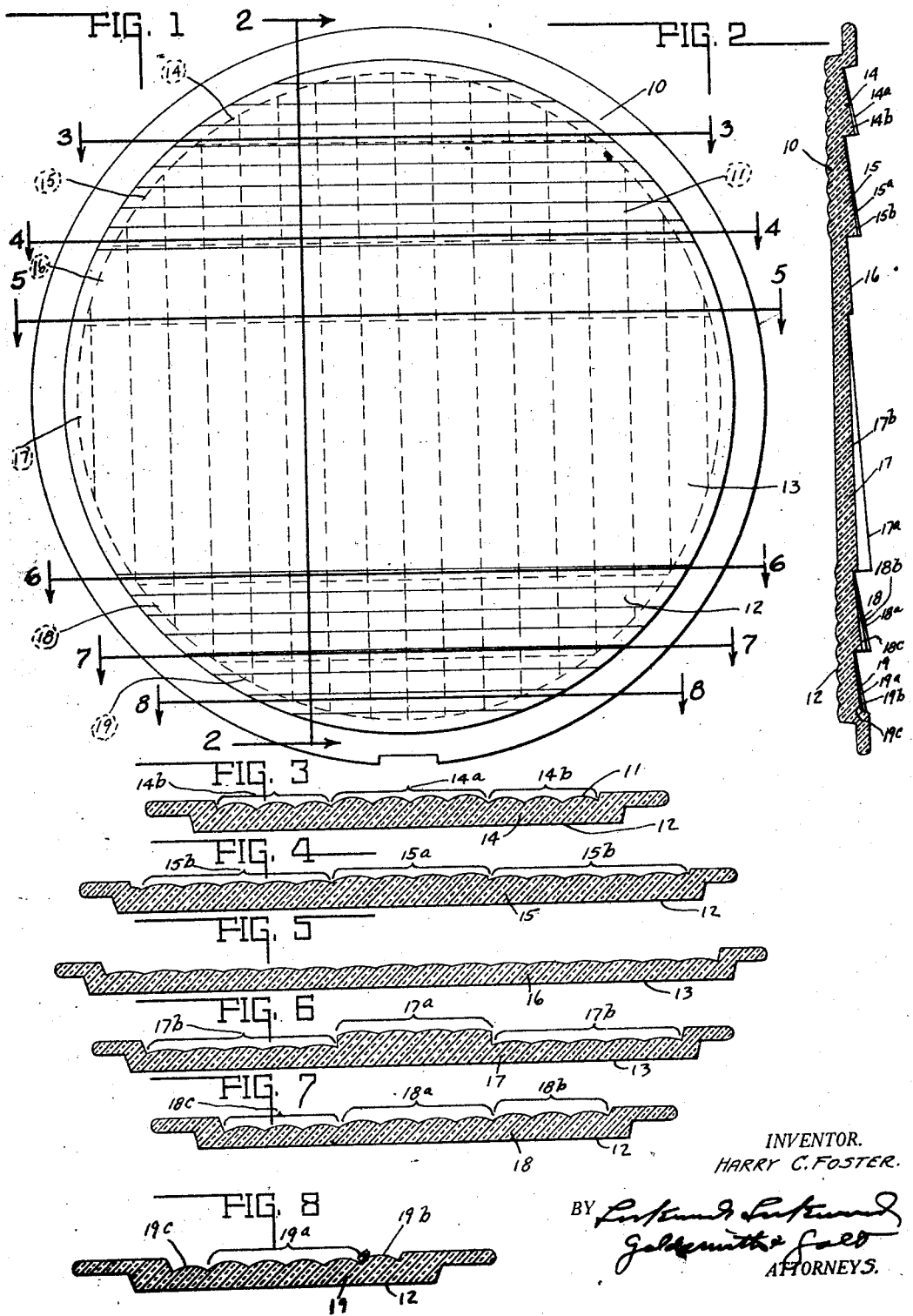

Oct. 9, 1928.

H. C. FOSTER 1,686,908

LENS FOR HEADLIGHTS

Filed Feb. 14, 1927

2 Sheets-Sheet 2

INVENTOR.
HARRY C. FOSTER.

BY
ATTORNEYS.

Patented Oct. 9, 1928.

1,686,908

UNITED STATES PATENT OFFICE.

HARRY C. FOSTER, OF CONNERSVILLE, INDIANA, ASSIGNOR TO INDIANA LAMP CORPORATION, OF CONNERSVILLE, INDIANA, A CORPORATION.

LENS FOR HEADLIGHTS.

Application filed February 14, 1927. Serial No 167,997.

This invention pertains to a lens for use in connection with headlamps, as a closure therefor, whereby the rays of light projected from the reflector will be deflected in such manner as to obtain the desired lateral spread and have certain characteristics hereinafter described.

The principal object of the invention resides in the arrangement of the transverse prisms in conjunction with the vertical flutes wherein said prisms will have varying angles of refraction decreasing from one side of the lens to the other for imparting a more uniform spread of the light rays such as to void any shadows or dark spots.

With a fluted prismatic lens of this character, it has been found that each vertical flute causes a spread of light substantially the full width of the spread caused by the combined flutes, whereby the rays passing through each of the respective flutes is substantially superimposed upon the rays passing through the adjacent flutes. On the other hand, the five principal prisms extending laterally of the lens, as herein shown, so deflect the rays as to cause them to be directed into five principal areas, one above the other, as illustrated in the drawings. But by reason of the decrease or increase of the refractive power of the prisms extending laterally from one side of the lens to the other, and in view of the fact that each flute gives a substantial spread, a gradual overlapping of the illuminated areas is caused, whereby they will be merged and the beam smoothed out to eliminate shadows or dark spots.

The full nature of the invention will be understood from the accompanying drawings and the following description and claim.

Figure 10:
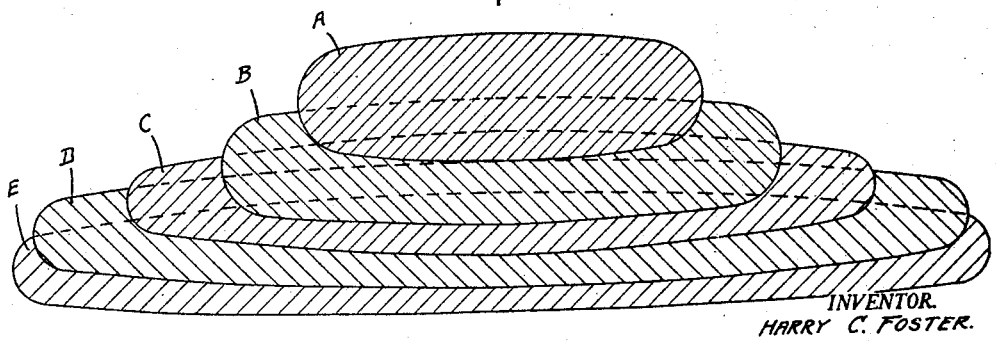

In the drawings, Figure 1 is a front elevation of the lens. Fig. 2 is a side elevation thereof. Figs. 3 to 8, inclusive, are sections taken on the lines 3—3 to 8—8, inclusive, of Fig. 1. Fig. 9 is a diagrammatical illustration showing areas of different refractive powers. Fig. 10 is a diagrammatical illustration of a pattern of light produced through the lens.

In the drawings there is shown a lens 10 having a plurality of vertically-extending flutes 11 formed on the back face therof, having at the upper and lower portions thereof horizontal flutes 12 formed on the front face, the central portions having a smooth flat surface 13.

As shown in Fig. 2, there is an upper prismatic section 14 extending transversely across the top of the prism. Immediately below the same there are transverse prismatic sections 15 and 16 respectively. The greater central portion of the lens is formed with a horizontal prismatic surface 17, below which there are horizontal prismatic sections 18 and 19.

The upper prismatic section 14 is divided into three areas, as shown in Fig. 9, the central area being designated by $14^a$ and the side areas by $14^b$. The area $14^a$ is formed at an angle from a central plane through the lens, which is greater than the angle formed by the area $14^b$. The prism 15 is divided into corresponding areas indicated by $15^a$ and $15^b$, the area $15^a$ being of an angle greater than the areas $15^b$. The prism 16 is formed with the same angle throughout its width. The prism 17 is divided into three areas, as shown in Fig. 9, indicated by $17^a$ and $17^b$. The area $17^a$ is formed at an appreciably greater angle than the areas $17^b$. The prism 18 is provided with three areas $18^a$, $18^b$ and $18^c$. The area $18^b$ is formed at a greater angle than the area $18^a$, while the area $18^c$ is formed at a lesser angle than area $18^a$. The prism 19 is formed of three areas, $19^a$, $19^b$ and $19^c$. The area $19^b$ is formed at a greater angle than the area $19^a$, and $19^c$ is formed at a lesser angle than area $19^a$.

Thus it will be noted that while the prism 16 has the same angle of refraction throughout, the prisms 14, 15 and 17 are formed at a greater angle of refraction in the center, while having equal angles of refraction on each side thereof. On the other hand, the two lower prisms 18 and 19 are formed with a greater angle of refraction on one side, the intermediate angle of refraction in the center and the lesser angle of refraction on the other side, whereby the angle of refraction of these two prisms increases from one side to the other, and the angle of refraction of the remaining prisms, with the exception of prism 16, increases from each side to the center.

When the lens above described is mounted with a parabolic reflector, having a light source properly focused with respect thereto, the beam of light projected therefrom through the lens will show a pattern substantially as illustrated in Fig. 10. The rays of light projected through the prism sections 17$^b$ will be deflected to illuminate an area on a screen at 25 feet distance from the lamp, as indicated by the letter A with a spread of approximately 10 degrees. The area B will be produced by the light rays projected through the uniform prism 16, having a spread of approximately 18 degrees. The pattern of light indicated by C will be produced by the projection of the beam through the areas of the lens indicated by 17$^a$ and the prism 15, having a spread of approximately 24 degrees. The pattern indicated by D will be produced by a projection of light through the prism 18, and the pattern indicated by E will be produced by the projection of light through the upper and lower prisms 14 and 19. The area D will have a spread of approximately 32 degrees, while the area E will have a spread of approximately 36 degrees. As shown in Fig. 10, the areas thus produced overlap each other, giving the general pattern desired.

Inasmuch as rays projected through any one of the sectional areas, as indicated in Fig. 9, will effect a substantial spread of the light on each side of the center, and likewise the rays projected through any one of the vertical flutes 11 will similarly spread the rays on each side of the center to a substantial degree, it will be apparent in general that the variation in refractive power of each of the prisms will cause a variation in the vertical position of the rays passing therethrough, so as to cause the areas illuminated thereby to overlap or merge one into the other. Thus while there is shown in Fig. 10 five definite areas, there will theoretically be as many overlapping areas in the pattern as there are prisms of different refractive power. By means of this arrangement, there will be such a distribution of light as to project a comparatively smooth beam, such as to eliminate shadows and dark spots which might otherwise be created.

For effecting even a greater smoothness of the pattern, and the shading of one set of rays passing through a particular prismatic section into the others, the horizontal flutes 12 are provided on the other side of the lens for spreading the rays passing therethrough vertically, such as to further merge one illuminated area into the other.

The invention claimed is:

A lens having a plurality of vertical flutes and horizontal prisms, said prisms being divided into sections of different refractive power, said horizontal prisms dividing the lens into a plurality of zones, the uppermost and lowermost zones being narrower and of greater refractive power than the central zone, and a plurality of horizontally extending flutes associated with the uppermost and lowermost zones.

In witness whereof I have hereunto affixed my signature.

HARRY C. FOSTER.